Aug. 25, 1925.

G. M. HOLLEY 1,550,699

POURING DEVICE FOR MOLDING MACHINES

Filed Oct. 25, 1923   2 Sheets-Sheet 1

GEORGE M. HOLLEY,
Inventor

By Stanley M. Udale
Attorney

Aug. 25, 1925.  1,550,699
G. M. HOLLEY
POURING DEVICE FOR MOLDING MACHINES
Filed Oct. 25, 1923    2 Sheets-Sheet 2

GEORGE M. HOLLEY.
Inventor

Stanley M Udale
Attorney

Patented Aug. 25, 1925.

1,550,699

UNITED STATES PATENT OFFICE.

GEORGE M. HOLLEY, OF DETROIT, MICHIGAN.

POURING DEVICE FOR MOLDING MACHINES.

Application filed October 25, 1923. Serial No. 670,644.

*To all whom it may concern:*

Be it known that I, GEORGE M. HOLLEY, a citizen of the United States, residing at 2152 Burns Ave., Detroit, in the county of Wayne and State of Michigan, have invented certain new and useful Improvements in Pouring Devices for Molding Machines, of which the following is a specification.

This invention relates to an improved pouring device for molding machines of the type corresponding to the co-pending application of De Forest W. Candler, filed October 3, 1921, Serial No. 504,988.

In pouring a molding machine of the type therein described the operator pours from a twenty or thirty pound ladle which he holds and which he frequently replenishes as he empties the ladle in filling the molds. In hot weather the actual operation is exhausting and the object of this invention is to relieve the operator of the strain to which he is now subjected because of his proximity to the molten iron and to the fact that he has to carry the iron from the "bull ladle" to the machine in his small ladle.

The iron as it issues from the cupola is caught in a large receptacle known as the "bull ladle." From this "bull ladle" the iron is distributed into the smaller ladles of a capacity of from 20 to 30 pounds, referred to above. If the attempt is made to pour directly from the "bull ladle" into the molding machine difficulty is experienced immediately due to the fact that the molding machine takes an intermittent supply of iron, and a large ladle cannot be arranged to give an intermittent flow, unless the intervening intervals of time are of an appreciable duration. The object of this invention, therefore, is to automatically convert the continuous flow from the "bull ladle" into an intermittent flow into each of the molds.

Figure 1:
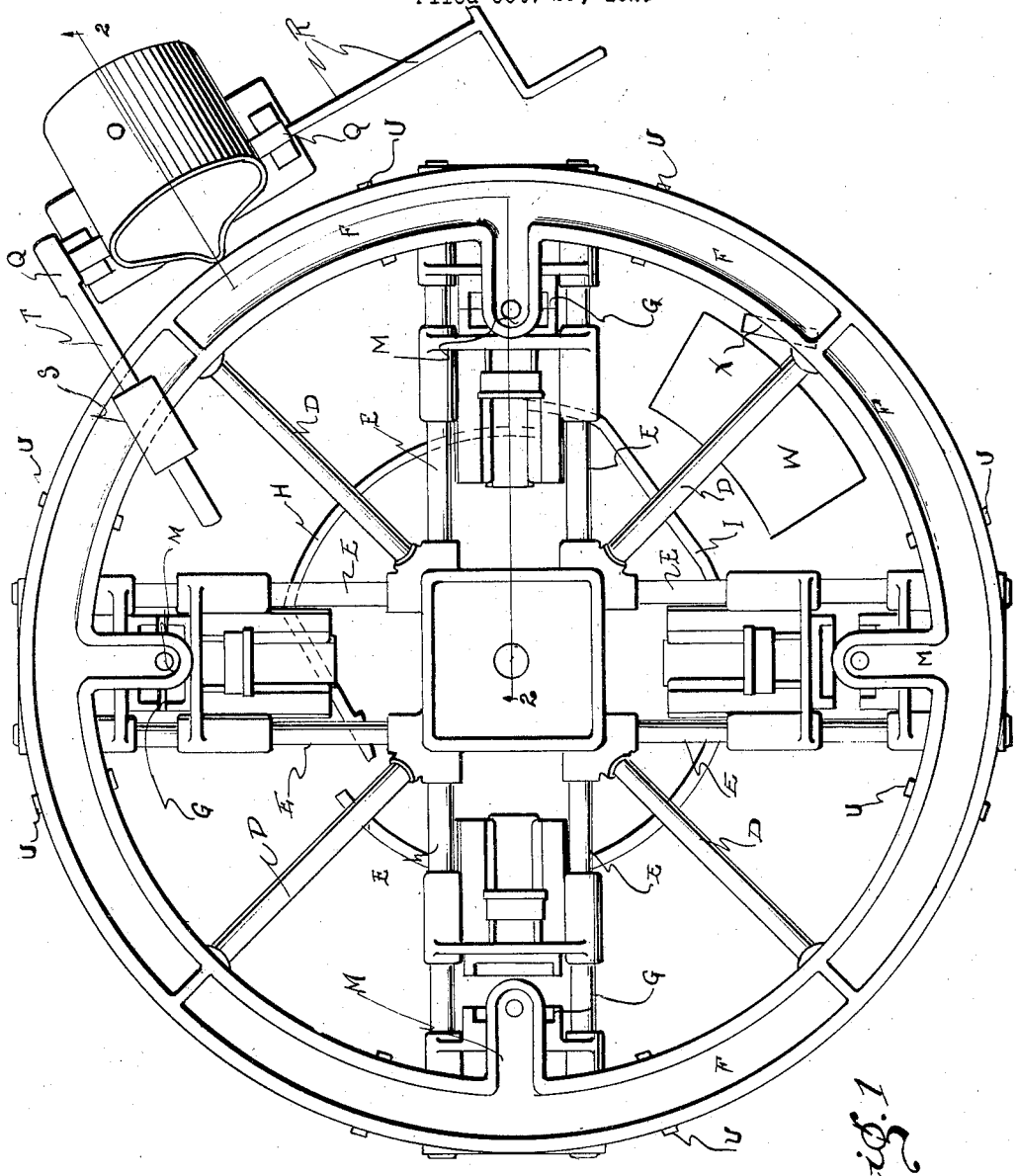
Figure 1 shows a plan view of a four headed machine to which the applicant's pouring device has been applied. Actually, in order to get economical production, twelve or more heads are mounted on a rotating machine of the type shown.
Figure 2:
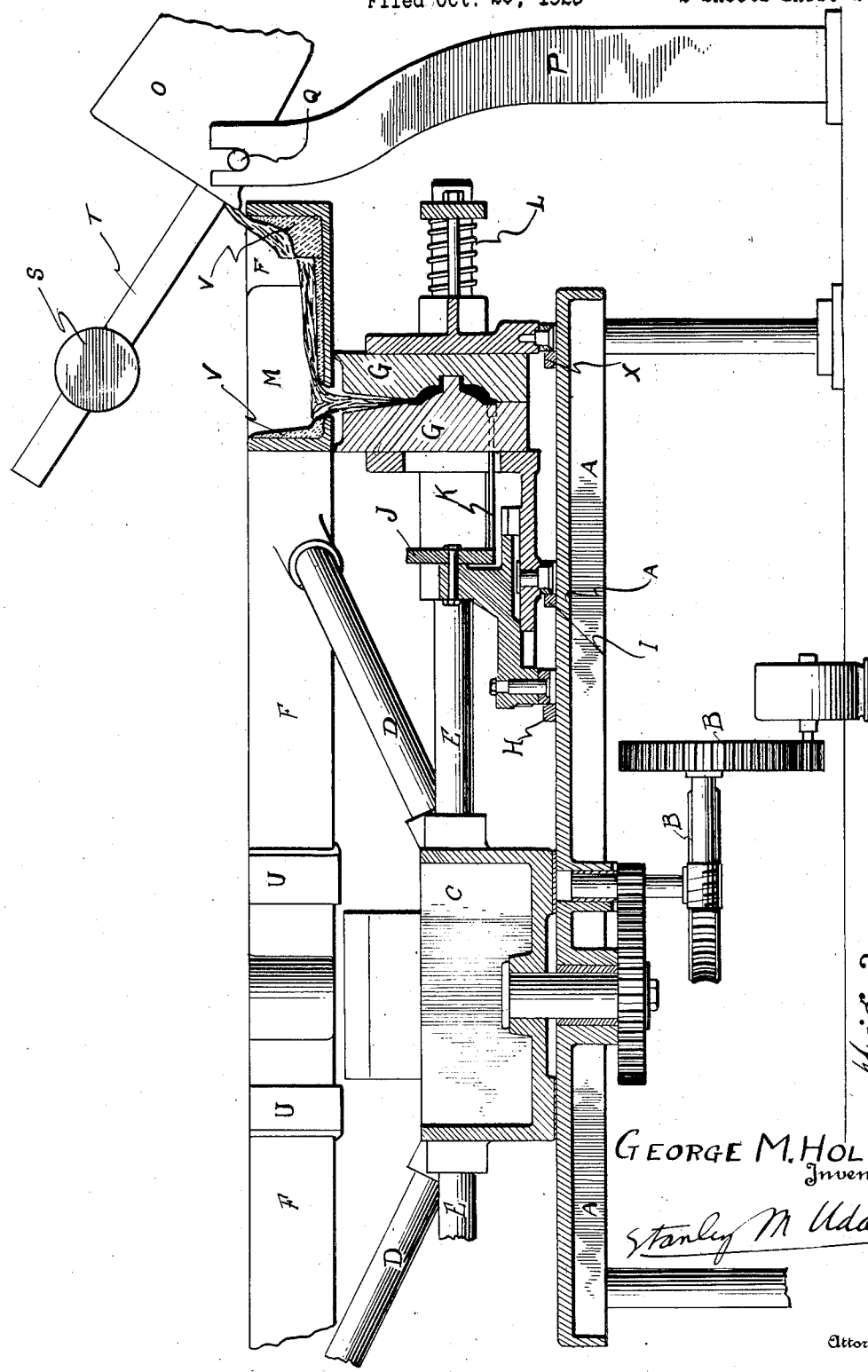
Figure 2 shows a cross sectional elevation on the plane 2—2 of Figure 1.

In Figures 1 and 2, A is the table on which the molding machine is mounted. B is the driving mechanism. C is the rotating turret. EE are the radial arms carrying the molds. DD are the radial arms inclined upwards, connected to the turret C and supporting the rotating pouring trough F. This pouring trough F is divided into as many sectors as there are molds. The molds GG are each mounted on the radial arms EE which successively open and close by means of the cams HI.

The castings are ejected from the molds by the knock-out mechanism JK. The corresponding knock-out mechanism on the outer mold is not shown. The pressure between the molds GG is limited and regulated by the springs L, two of which are mounted on each mold. The pouring trough F is provided with discharge outlets M from which the iron discharges into the molds G, there being as many outlets M as there are molds G. The bull ladle is shown at O mounted on a support P and trunnion Q. An arm R is provided and a counterweight S so that the operator can adjust the flow from the bull ladle O into the trough F at a considerable distance from the bull ladle and with the least possible effort, the counterweight S being adjusted so as to practically balance the weight of the bull ladle and the iron contained therein. The counterweight S is connected to the trunnions Q through the lever arm T.

The trough F is made in sectors connected by the U-straps U so that the outlets M are made in separate pieces from the arcs F to which they are connected. The trough is thus built up of the sectors F and the outlet pieces M. The inside of the trough F and outlets M is protected with a fire clay lining V, the purpose of which is to prevent the iron freezing in the trough which would inevitably result unless heat insulation is used and naturally it must have high refractory qualities in order to withstand the erosive action of the flowing iron therethrough. An opening W is left in the table A through which the castings are ejected.

The function of the cam X is to operate the knock-out mechanism of the outer mold G, the mold G being moved outward and the knock-out being held stationary. As stated before, as actually made from twelve to twenty-four heads are equipped on machines of this type and hence the arc F is comparatively short and the distance the iron has to flow from the bull ladle O to the outlet M is relatively short. Four heads are shown merely to illustrate the principle of operation and to avoid confusion involved in an elaborate drawing necessary to illustrate a twelve or twenty-four headed machine.

Operation. The trough F and outlet M are first heated in the usual manner. The molds G are also heated and are coated with lampblack. The machine is rotated at a predetermined speed and the iron in the bull ladle O poured into the trough F at a rate regulated by the operator, who stands between the handles of the operating arm R in such a position that he has a good view of the outlet M, so that he may carefully observe whether or not the iron is flooding the top of the mold G so that he can keep the size of the sprue down to the minimum size necessary to get a good casting and at the same time keep the scrap loss down to a low figure.

What I claim is:

In a molding machine of the type described having a plurality of rotating molds, a rotating annular trough, a plurality of outlets from said trough leading to said molds, means for pouring iron into said trough.

In testimony whereof I affix my signature.

GEORGE M. HOLLEY.